(12) United States Patent
Peppard (10) Patent No.: US 6,978,694 B2
(45) Date of Patent: Dec. 27, 2005

(54) HANDLEBAR THROTTLE CONTROLLER WITH HYSTERESIS

(75) Inventor: Michael Peppard, Novi, MI (US)

(73) Assignee: Magneti Marelli Powertrain U.S.A., Inc., Farmington Hills, MI (US)

( * ) Notice: Subject to any disclaimer, the term of this patent is extended or adjusted under 35 U.S.C. 154(b) by 179 days.

(21) Appl. No.: 10/313,559

(22) Filed: Dec. 6, 2002

(65) Prior Publication Data

US 2004/0107789 A1 Jun. 10, 2004

(51) Int. Cl.$^7$ .......................................... B60K 26/02
(52) U.S. Cl. ......................................... 74/489; 74/531
(58) Field of Search .............................. 74/484 R–489, 74/551.1–551.9, 511 R, 504, 502.2, 531

(56) References Cited

U.S. PATENT DOCUMENTS

| | | | |
|---|---|---|---|
| 2,788,676 A | * | 4/1957 | Spexarth ...................... 74/489 |
| 3,752,006 A | * | 8/1973 | Bartlett ........................ 74/489 |
| 4,616,504 A | | 10/1986 | Overcash et al. |
| 4,944,269 A | | 7/1990 | Imoehl |
| RE34,302 E | | 7/1993 | Imoehl |
| 5,370,017 A | * | 12/1994 | Krauer ...................... 74/502.2 |
| 5,416,295 A | | 5/1995 | White et al. |
| 5,460,035 A | | 10/1995 | Pfaffenberger |
| 5,572,907 A | * | 11/1996 | Kaakinen ..................... 74/489 |
| 5,613,652 A | | 3/1997 | Greene |
| 5,893,295 A | * | 4/1999 | Bronnert ...................... 74/488 |
| 5,969,519 A | | 10/1999 | Steiling et al. |
| 6,209,418 B1 | | 4/2001 | Kalsi et al. |
| 6,250,173 B1 | * | 6/2001 | Huston ........................ 74/489 |
| 6,276,230 B1 | | 8/2001 | Crum et al. |

FOREIGN PATENT DOCUMENTS

DE 100 27 193 A1 12/2001

OTHER PUBLICATIONS

MAGURA Motorcycle Components, www.magura.com, p. 32, "Electric throttle twist grip", 2002.

* cited by examiner

Primary Examiner—Chong H. Kim
(74) Attorney, Agent, or Firm—Brooks Kushman P.C.

(57) ABSTRACT

A handlebar throttle controller includes a cylindrical housing adapted to be rotatably mounted to an end of a handlebar, and a rotary shaft supported within the housing for relative rotation about a longitudinal axis. A first spring angularly biases the shaft toward a first angular position, while at least one of a cam and follower arrangement and a friction element and reaction element arrangement generates a first torque characteristic resisting relative rotation of the shaft when the shaft is rotated in a first direction relative to the housing, and a second torque characteristic resisting relative rotation of the shaft within the housing when the shaft is rotated in a second direction relative to the housing. A sensor on the housing generates an electrical output representative of an instantaneous angular position of the shaft relative to the housing, for use, for example, in an electronic throttle control system.

27 Claims, 6 Drawing Sheets

HANDLEBAR THROTTLE CONTROLLER WITH HYSTERESIS

BACKGROUND OF THE INVENTION

1. Field of the Invention

The invention relates to handlebar-mounted electronic sensor assemblies for a motorcycle with which to detect an operator's request for a given throttle angle and/or torque output from the motorcycle's engine, the sensor output signal thereafter being used by an engine control processor to thereby control engine operation.

2. Background Art

The prior art teaches electronic throttle control (ETC) systems for motor vehicles in which an operator's request for a desired throttle angle or torque output is detected by at least one electronic sensor to obtain a throttle request signal that is thereafter used by an engine control module in selecting a suitable engine operating condition, for example, through adjustment of such engine operating parameters as engine air-fuel ratio (either through control of air mass flow, of metered fuel, or both), ignition timing or "spark," EGR, and valve timing, among others. Thus, for example, U.S. Pat. No. 6,276,230 teaches a handlebar throttle controller for a motorcycle in which an angle sensor generates an output voltage generally proportional to the extent to which an operator has angularly displaced a grip relative to the handlebar. A return spring biases the grip towards a first angular position against an idle stop to ensure that the request signal returns to an idle request upon release by the operator of the grip.

Unfortunately, the operation and feel of such spring-biased handlebar throttle controllers remains significantly different from mechanical throttle linkages. With mechanical throttle linkages using a sheathed cable, torque defines a hysteresis loop characterized by an increased resistance to relative angular movement of the grip as the operator requests an increased engine output, and increased hysteresis as angular movement increases. This torque displacement characteristic is created at least in part due to the frictional interaction of the control cable, its enveloping sheath, the throttle return spring and linkage geometry.

Accordingly, what is needed is a handlebar throttle controller that provides a more-realistic throttle "feel" than is provided by such known handlebar throttle controllers providing the operator with good control of the engine.

SUMMARY OF THE INVENTION

It is an object of the invention to provide a handlebar throttle controller that provides a throttle "feel" that more closely simulates the feel, control and hysteresis characteristic of known mechanical throttle linkages especially those conventionally used in motorcycles. It is desired to provide better operator control of the throttle using a relatively simple mechanical design. It is also desired to provide a consistent throttle feel from motorcycle to motorcycle in production with the feel tuneable as a design characteristic.

A handlebar throttle controller of the present invention can be used on a motorcycle in connection with an electronic throttle control system. One such throttle controller embodiment includes a cylindrical housing adapted to be nonrotatably received within a generally-tubular end of a handlebar, and an elongate shaft supported within the housing for relative rotation about a longitudinal axis. A first spring on the housing angularly biases the shaft toward a first relative angular position within the housing, while at least one coupling selected from the group consisting of a cam and follower arrangement, and a friction element and reaction element arrangement generates a first torque characteristic resisting relative rotation of the shaft within the housing when the shaft is rotated in a first direction relative to the housing away from the shaft's first angular position, and a second torque characteristic resisting relative rotation of the shaft within the housing when the shaft is rotated in a second direction relative to the housing toward the shaft's first angular position. A sensor on the housing, suitably coupled to the shaft, generates an electrical output representative of an instantaneous angular position of the shaft relative to the housing.

In accordance with a feature of the invention, in a first exemplary embodiment, a first coupling includes a cam and follower arrangement wherein an annular cam is disposed about the shaft in an annular space between the shaft and the housing. A follower is mounted on the shaft adjacent to a camming surface of the cam such that, upon relative rotation of the shaft, the follower moves along the camming surface to axially displace the cam toward a radial shoulder defined on the shaft. A coil spring disposed about the shaft between the radial shoulder and the cam is compressed in response to such axial displacement of the cam to thereby provide increasing resistance with increasing relative rotation of the shaft within the housing. In this manner, the invention advantageously allows the camming surface of the cam and the spring rate of the coil spring to define the resisting torque characteristic of the controller. It will be appreciated that the construction further features a compact design wherein the coil spring cooperates with the camming surface and the follower to bias the shaft to a first relative angular position, for example, adjacent to an idle stop, thereby obviating the need for a separate return spring. The cam can be provided with an over travel closed position so that the throttle controller can also provide a cruise control OFF signal.

In a variation of the first exemplary throttle controller, the shaft is supported for rotation within the housing using a bushing, with a second radial shoulder defined on the shaft which bears against an opposed axial face of the bushing. The resulting frictional engagement of the shaft's radial shoulder with the axial face of the bushing provides a resisting torque characteristic that increases as the coil spring is increasingly compressed through the interaction of the shaft-mounted follower with the camming surface of the cam. The radial engagement of the shaft in the bushing further serves to complement the varying axial frictional component to provide a slight but predetermined "stickiness" to the resisting torque characteristic of the throttle controller, to thereby provide an improved "feel" when compared to prior mechanical throttle linkages.

In another embodiment, the coupling includes a pair of friction element and reaction element arrangements disposed about the shaft, each of which is engaged by a respective one-way clutch member, under the influence of a respective coil spring, when the shaft rotates in a respective direction relative to the housing. In this manner, the resisting torque characteristic in each rotation direction can be individually defined by the frictional properties of the friction elements and the relative spring rates of the coil springs.

In another embodiment a linear position sensor is used, rather than a rotary sensor, to detect axial movement of the cam member providing a throttle position output.

In yet another embodiment, the throttle controller is located externally (i.e. coaxially) about the handlebar.

Other advantages, features, and benefits of the invention will be readily apparent from the following detailed description of a preferred embodiment, when taken in connection with the accompanying Drawings.

BRIEF DESCRIPTION OF THE DRAWINGS

In the Drawings, wherein like elements are identified by like reference numbers among the various views.

DETAILED DESCRIPTION OF THE PREFERRED EMBODIMENTS

Figure 1:
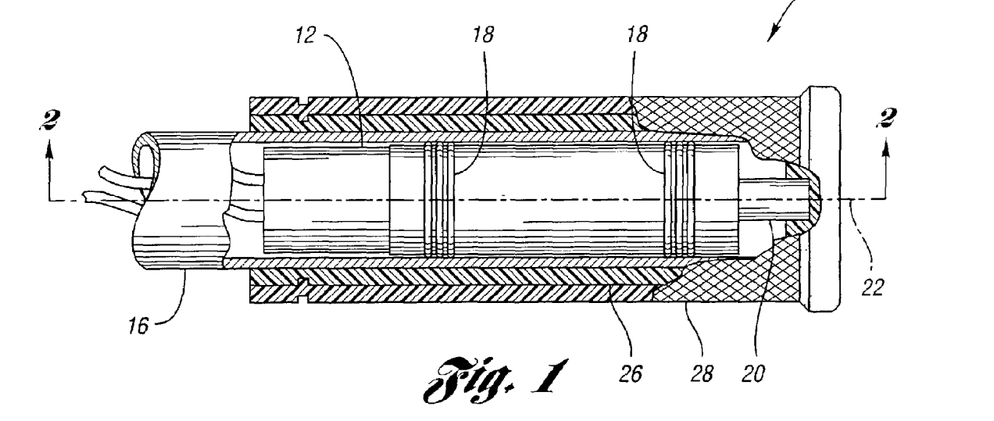
FIG. 1 is a side elevation, partially broken away, of a first exemplary handlebar throttle controller in accordance with the invention.
Figure 2:
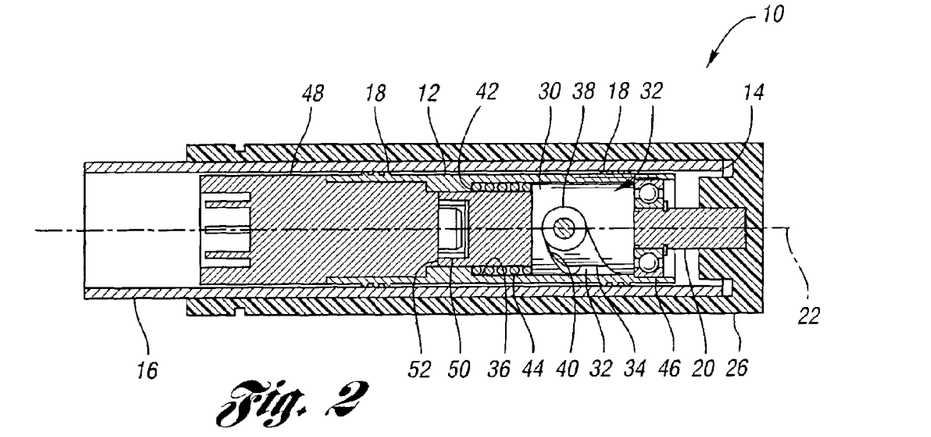
FIG. 2 is a sectional view of the first handlebar throttle controller to get along the line 2—2 of FIG. 1.
Figure 3:
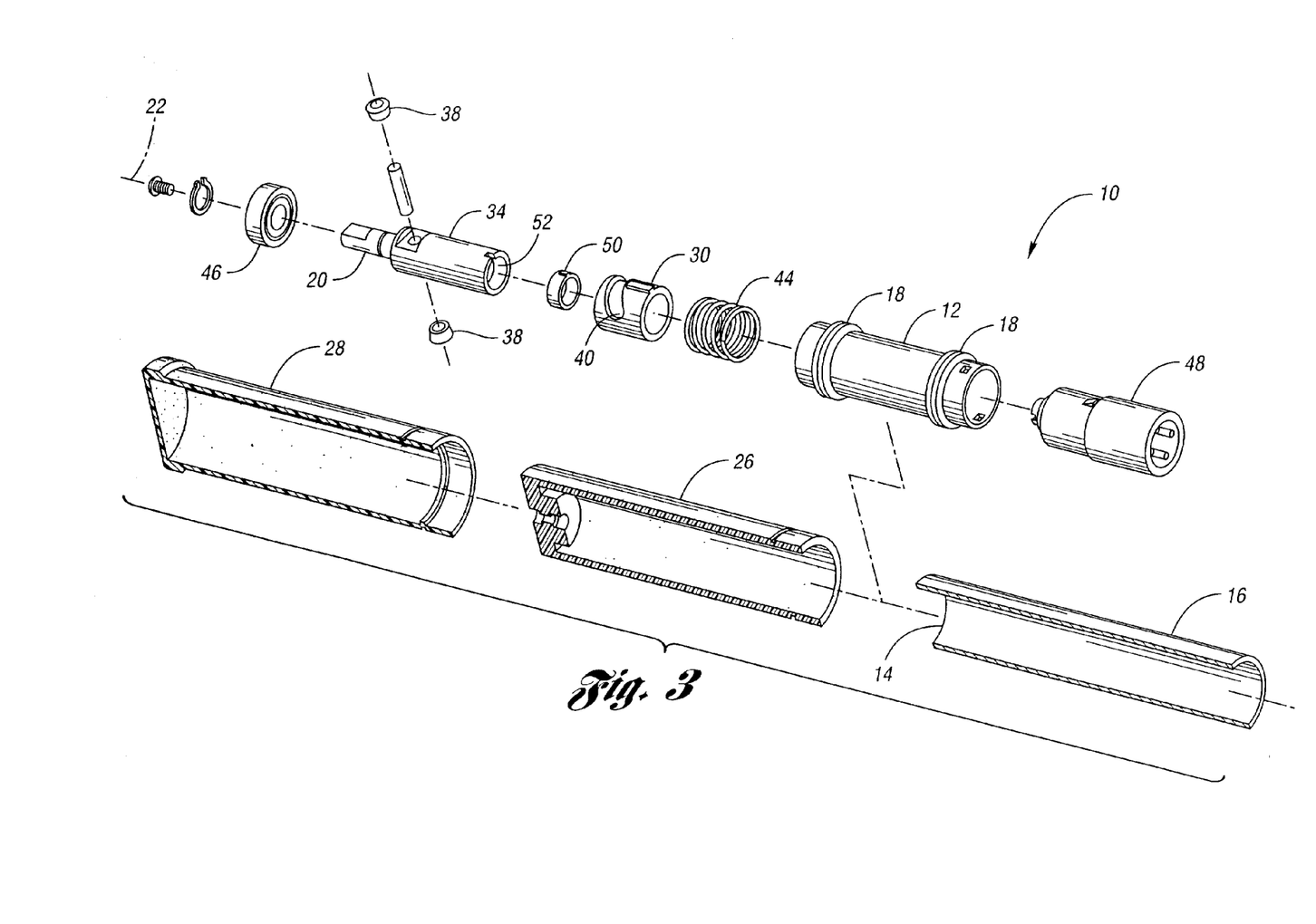
FIG. 3 is an exploded view of the first handlebar throttle controller.

Referring to FIGS. 1–3, a first exemplary handlebar throttle controller 10, for example, for a motorcycle (not shown), includes a generally-cylindrical housing 12 that is adapted to be nonrotatably received within an end 14 of a motorcycle's generally-tubular handlebar 16. While the invention contemplates securing the housing 12 to the end 14 of the handlebar 16 in any suitable manner, the housing 12 of the first throttle controller 10 includes a plurality of deformable plastic outer ribs 18 which serve to retain the housing 12 within the handlebar 16 as through a press-fit. An elongate shaft 20 is supported within the housing 12 for relative rotation about a longitudinal axis 22, for example, by a ball bearing 24. The shaft 20 is mechanically coupled to inner and outer grip members 26,28 journaled about the handlebar 16 such that a motorcycle operator may conveniently impart a desired relative rotation of the shaft 20 within the housing 12 by rotating the grip members 26,28 relative to the handlebar 16.

As best seen in FIGS. 2 and 3, the first throttle controller 10 includes a cam and follower arrangement that includes an annular cam 30 disposed about the shaft 20 within an annular space 32 defined between an intermediate radially-stepped portion 34 of the shaft 20 and an inner surface 36 of the housing 12. A follower 38 is mounted on the shaft 20 adjacent to a camming surface 40 of the cam 30 such that, upon relative rotation of the shaft 20 within the housing 12, the follower 38 moves along the camming slot surface 40 to axially displace the cam 30 toward an adjacent radial shoulder 42 defined on the inner surface 36 of the housing 12. More specifically, the cam 30 travels axially within a range of motion which includes a throttle position, and a wide open throttle (WOT) position. A coil spring 44, disposed about the shaft 20 in the annular space 32 between the housing's radial shoulder 42 and the cam 30, is compressed in response to such axial displacement of the cam 30 to thereby provide a resistance to such further rotation as defined by the profile of the camming slot surface 40 and the properties of the coil spring 44.

Figure 4:
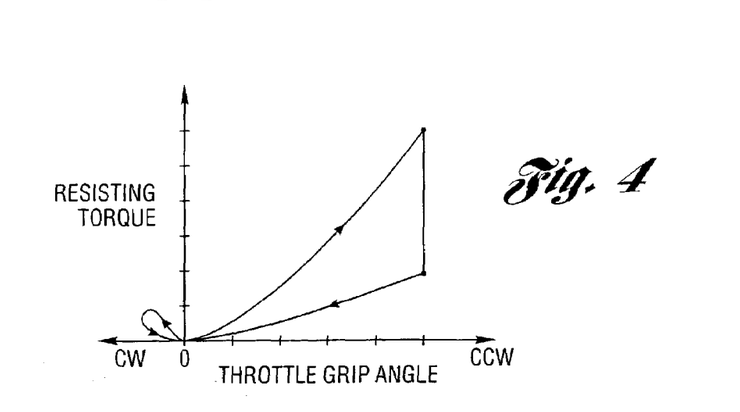
FIG. 4 is a plot of torque vs. throttle angle θ illustrating the hysteresis effect achieved by the first handlebar throttle controller.

In this manner, to the extent that other frictional interaction of the shaft 20 within the housing 12, and of the grips 26,28 and the outer surface of the handlebar 16, are suitably controlled or minimized (as, for example, through the use of a ball bearing 46), the cam 30 and the coil spring 44 cooperate to define the resisting torque characteristic of the first throttle controller 10. It will be appreciated that the construction of the first throttle controller 10 further features a compact design in which the coil spring 44 cooperates with the camming slot surface 40 and the follower 38 to thereby nominally bias the shaft 20 to a first relative angular position within the housing 12, thereby obviating the need for a separate return spring. However, it will be appreciated that a second torsional return spring (not shown) may be used in addition to the coil spring 44 to thereby supplement or otherwise tailor the controller's resisting torque characteristic as desired. FIG. 4 illustrates the resulting resisting torque characteristic, including a hysteresis effect providing a greater resisting torque characteristic as the shaft is rotated away from the first angular position (θ=0°) than when the shaft is rotated back toward the first angular position.

Returning to FIGS. 1–3, the first throttle controller 12 further includes a sensor 48 on the housing 12 that generates an electrical output representative of an instantaneous angular position of the shaft 20 relative to the housing 12. While the sensor 48 is coupled to the shaft 20 in any suitable manner, in the first throttle controller 10, the sensor 48 is a rotary Hall effect sensor that is responsive to a magnetic field generated by a magnet 50 disposed in an end 52 of the shaft 20. In this manner, the sensor 48 is inherently less susceptible to misalignment due, for example, to tolerance variation. However, it will be appreciated that the invention contemplates use of any suitable sensor, including potentiometer-based sensors.

Figure 5:
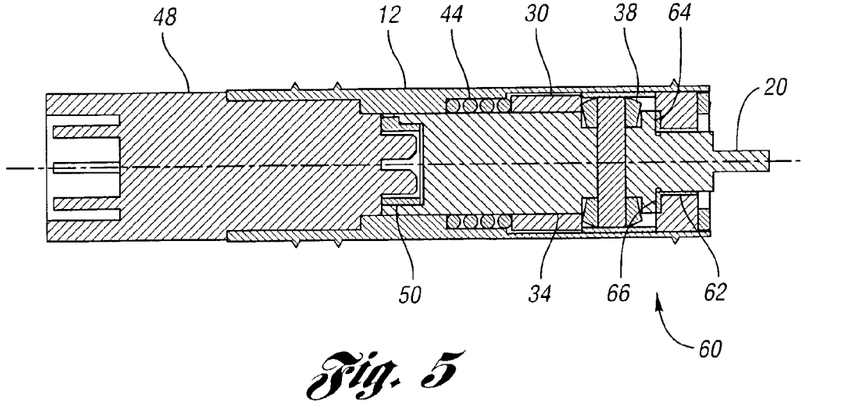
FIG. 5 is a longitudinal section of a second exemplary handlebar throttle controller in accordance with the invention.

A second exemplary throttle controller 60 in accordance with the invention is illustrated in FIG. 5. While the second throttle controller 60 includes many features of the first throttle controller 10, including the use of a cam and follower arrangement 30,38 with which to define at least a portion of the controller's resisting torque characteristics, the second throttle controller 60 further features a shaft 20 that is supported for rotation within the housing 12 using a bushing 62, rather than the ball bearing 46 of the first throttle controller 10. The shaft 20 of the second throttle controller 60 further includes a second radial shoulder 64, which bears against an opposed axial face 66 of the bushing 62. The resulting frictional engagement of the shaft's radial shoulder 64 with the axial face 66 of the bushing 62 provides a resisting torque characteristic that increases as the coil spring 44 is increasingly compressed through the interaction of the shaft-mounted follower 38 with the camming surface 40 of the cam 30. The radial engagement of the shaft 20 in the bushing further serves to complement the varying axial frictional component to provide a slight but predetermined "stickiness" to the resisting torque characteristic of the throttle controller, to thereby provide an improved "feel" when compared to prior mechanical throttle linkages.

Figure 6:
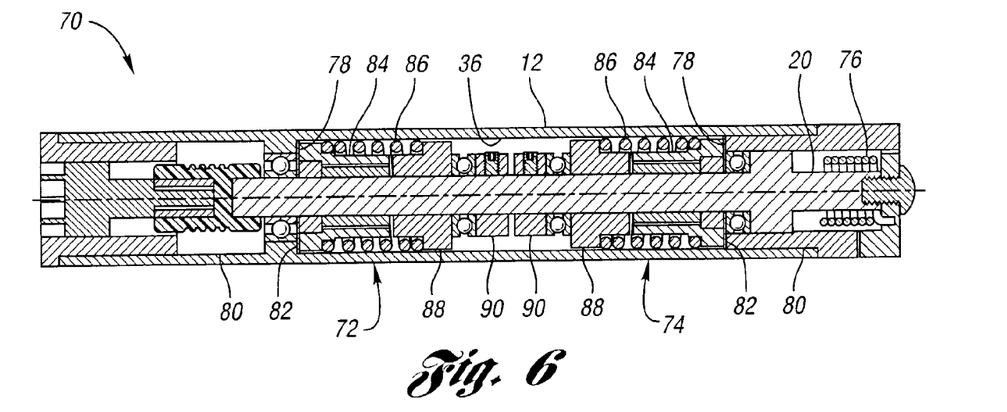
FIG. 6 is a longitudinal section of a third exemplary handlebar throttle controller in accordance with the invention.
Figure 7:
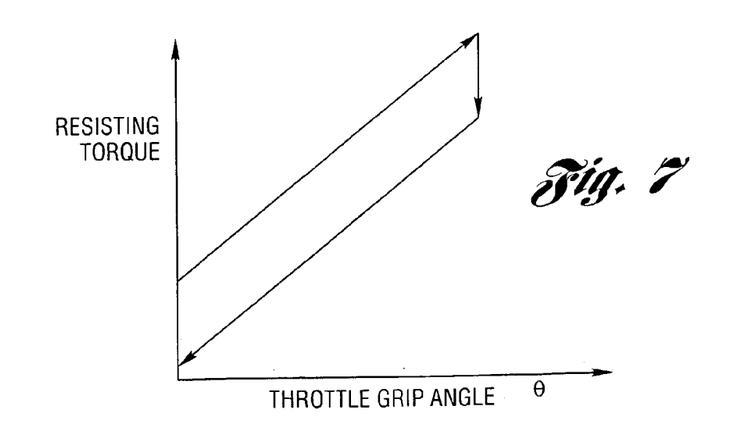
FIG. 7 is a plot of torque vs. relative throttle angle θ illustrating the hysteresis effect achieved by the third handlebar throttle controller.

Referring to FIGS. 6 and 7, in yet another exemplary throttle controller 70 in accordance with the invention, the coupling between the shaft 20 and the housing 12 defining the controller's resistive torque characteristics includes a pair of friction element and reaction element arrangements 72,74, along with a separate return spring 76 that nominally biases the shaft toward the first angular position relative to the housing 12. Each of the friction element and reaction element arrangements 72,74 includes a respective friction element 78 disposed about the shaft 20, and a reaction element 80 integrally-formed in, or otherwise nonrotatably coupled to, the housing 12 along its inner surface 36. An axial face 82 of a respective one-way clutch member 84 is urged by a respective coil spring 86 (as backed by a block 88, mounted for rotation about the shaft 20 and axially located on the shaft 20 with a locking collar 90) against the friction element 78 to engage the friction element 78 with the reaction element 80 when the shaft 20 rotates in a respective direction relative to the housing 12.

In this manner, the resisting torque characteristic of the third throttle controller 70 in each direction of shaft rotation is predominantly individually defined by the frictional properties of the friction element and reaction element arrangements, the relative spring rates of the coil springs 86, and the spring rate of the return spring 76, as illustrated in FIG. 7.

Figure 8:
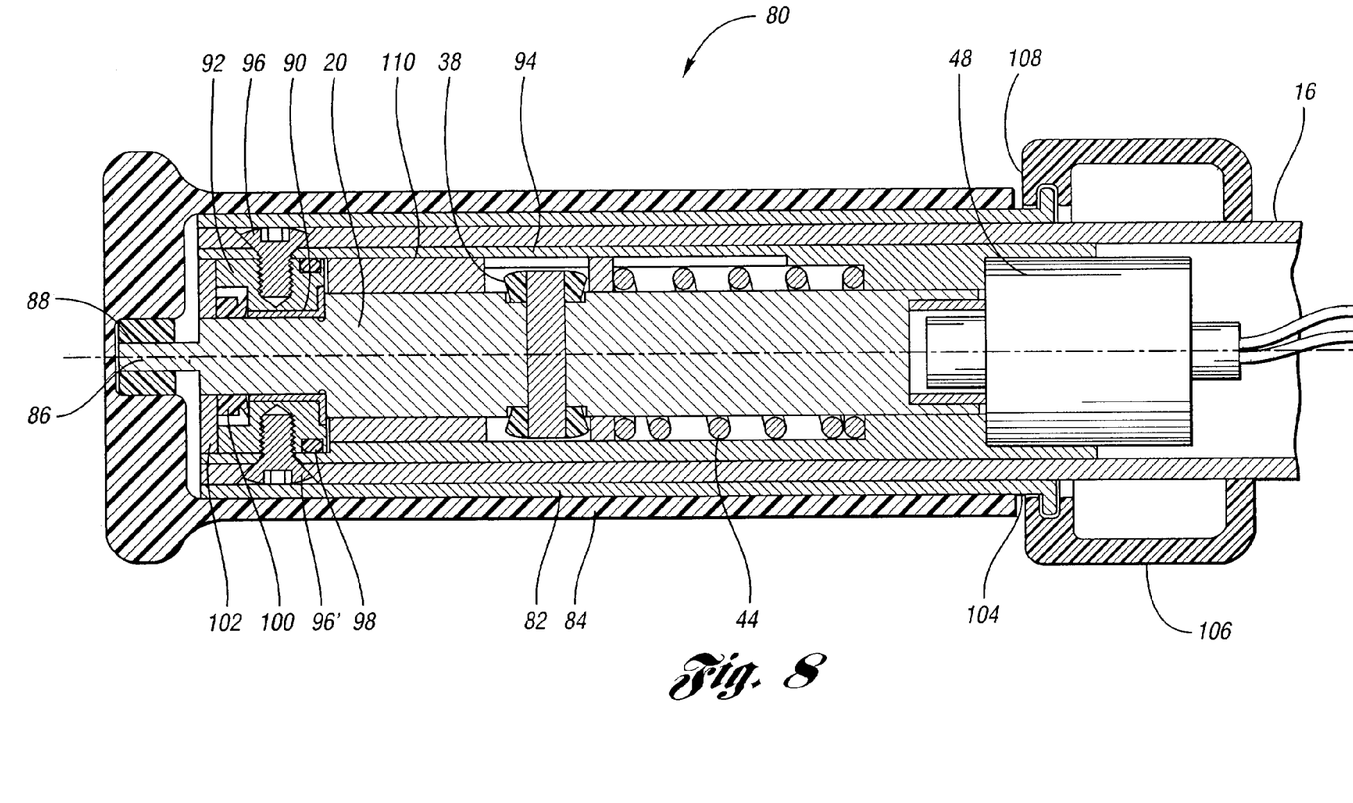
FIG. 8 is a cross sectional side elevation of a fourth exemplary handlebar throttle controller in accordance with the invention.

A fourth throttle controller embodiment 80 is shown in FIG. 8. Since the throttle grip is conventionally located on the right hand side of an internal combustion engine driven vehicle with steering handles, FIG. 8 may illustrate a section view wherein the viewer's perspective is facing the vehicle. Of course, the invention contemplates use of a throttle controller on any handle, regardless of side or orientation.

Throttle controller 80 is substantially similar to throttle controller 10 illustrated in FIGS. 1 and 2. Throttle controller 80, being more refined and production ready in design, is provided with seals to maintain the throttle controller 80 in a watertight condition. The throttle controller 80 is also provided with means for attachment to a motorcycle handlebar 16. The grip member of the throttle controller 80 is formed of a rigid plastic inner component 82 and a soft rubber-like outer component 84 which rotate together about the distal end of handlebar 16.

Grip member 82 is provided with a central, axially aligned, non-circular pocket 86 sized to incorporate and receive a correspondingly shaped non-circular end 88 of rotary shaft 20. Shaft 20 pivotally mounts within a bore formed in low friction plastic bushing 90 mounted in annular shoulder member 92. Shoulder member 92 is affixed to housing 94 and handlebar 16 by a pair of threaded fasteners. A suitable sealant such as medium weight grease or the like is provided between the outer periphery of housing 94 and the internal diameter of the handlebar 16 to prevent the entry of water therebetween. A series of annular seals 98, 100 and plastic end plate 102 serve to provide a fluid-type rotary seal between shaft 20 and housing 94 to make the opening of the handlebar 16 and associated throttle controller 80 virtually watertight. Grip members 82 and 84 are pivotally mounted on the external periphery of handlebar 16. To prevent the grip members 82 and 84 from being axially removed from the end of the handlebar 16, an annular groove 104 is provided in the mounted, proximal end of the collaborating grip members 82 and 84, which cooperate with a two-part clam shell switch housing 106, which is clamped about handlebar 16 at a fixed axial position. Switch housing 106 has an annular extending inward flange 108 cooperating within groove 104 in the grip,(provided collectively by grip members 82 and 84), thereby permitting free relative rotation, yet limiting axial movement of the grip members 82 and 84 with respect to the handlebar 16.

Figures 9A, 9B, 10:
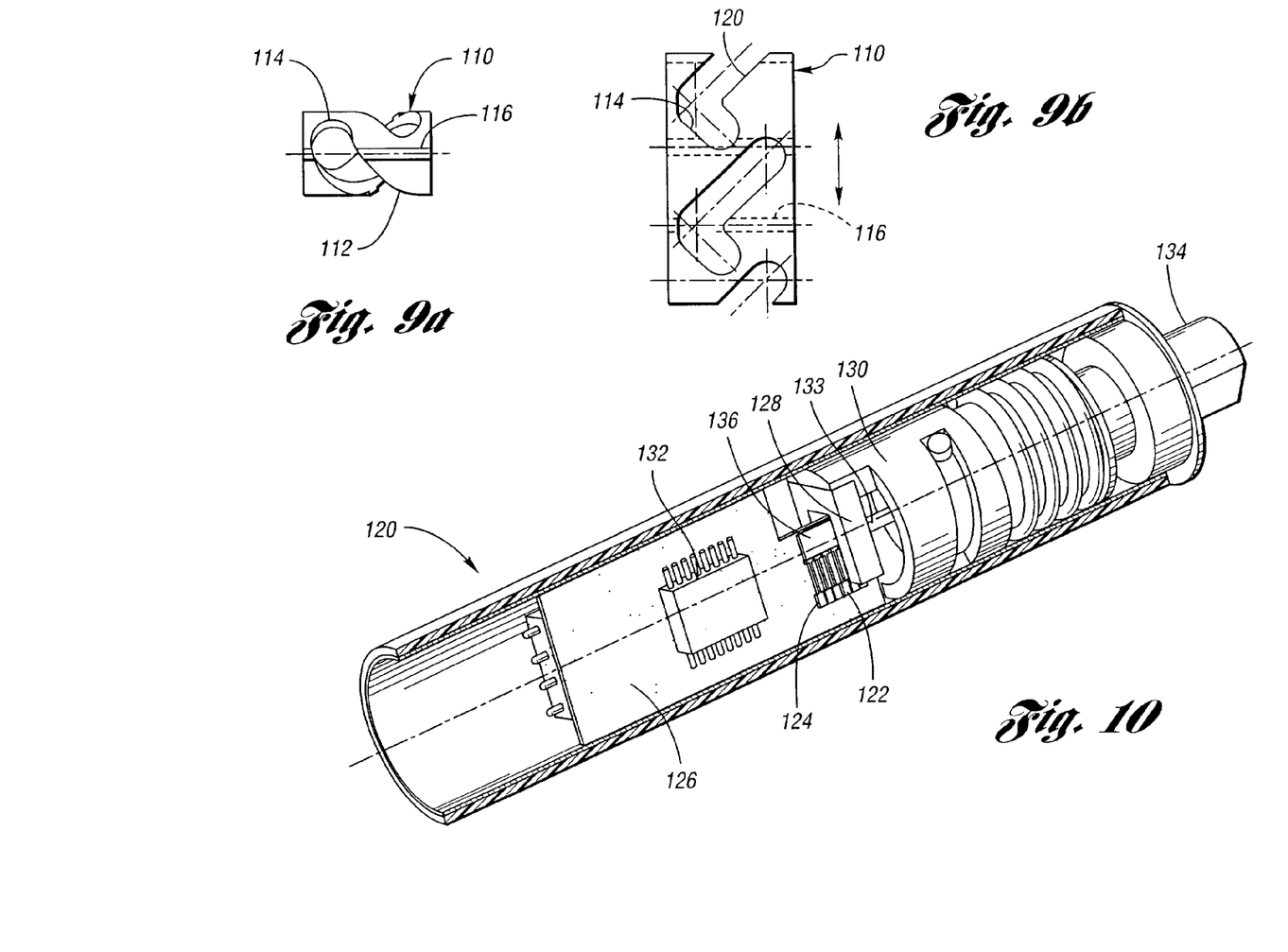
FIG. 9A is a side view of a modified cam member having a closed over travel region.
FIG. 9B is an illustration depicting the cam member of FIG. 9A cut along an axial seam and unrolled flat, viewed from the inside diameter surface to better illustrate the cam slot over travel region.
FIG. 10 is a partially cutaway perspective view of a fifth exemplary handlebar throttle controller in accordance with the present invention.

A detailed view of a cam member 110, utilized in throttle controller 80, is shown in FIG. 9a. Cam member 110 is similar to cam 30, which is described with reference to FIGS. 1 and 2, except that cam slot 112 is provided with an over-travel cam slot portion 114. The over-travel cam slot portion 114 enables the throttle grip to be rotated in the throttle-closing direction beyond the normal, fully closed stop grip position. To better illustrate the over-travel cam slot portion 114, the cam slot 112 is illustrated in a flattened state, as if the cam 110 were cut axially along one side and unrolled in order to be flat. The extreme left portion of cam slot 112, in FIG. 9b, represents the zero throttle position. Rotating the throttle grip counterclockwise when viewed from the distal end (left in FIGS. 8–9b), causes the cam member 110 to radial displace in a manner, which is illustrated by the downward directional arrow in FIG. 9b. This motion causes the follower 38 to ride within the cam slot 112, thus biasing the cam member 110 to shift to the right in FIG. 9a compressing the associated coil spring 44 (shown in FIG. 8). Note that cam member 110 can freely move axially, but is prevented from rotating relative to the associated housing by a series of external ribs 116, formed on the periphery of cam member 110, which cooperate with corresponding grooves in the housing 94.

When the operator lets go of the throttle control grip, the throttle returns to the zero position. If the vehicle operator rotates the grip clockwise, when viewed from the distal end, beyond the zero closed position, the follower 38 rides up the cam slot portion 114 causing the cam member 110 to move inboard thus compressing the spring 44.

This negative grip angle information can be used for a number of purposes, but most preferably is used to provide a cruise control OFF signal. Normally, when a motorcycle having a conventional throttle and the throttle cable is provided with cruise control, cruise control not only positions the throttle blade within the throttle body, but likewise maintains the throttle grip in a corresponding position since the throttle grip and the throttle blade are interconnected by a mechanical throttle shaft. With utilization of the electronic throttle control of the present invention there is no mechanical connection between the throttle grip and the throttle shaft. Therefore, when cruise control is utilized, absent the addition of a force feedback servomotor to position the throttle grip, the throttle will become inactive when released by the operator and returned to the zero throttle angle position. Traditionally, in a conventional motorcycle, the cruise control can be turned off in one of several ways, including: by turning off the cruise control switch or by rotating the throttle back toward the zero position. The over-travel cam slot portion 114 enables the motorcycle operator, utilizing throttle controller 80, to rotate the grip portion clockwise past the normal zero position, as shown in FIG. 4, providing a negative throttle position output of the sensor.

A fifth throttle controller 120 is illustrated in FIG. 10. Rather than using a rotary position sensor to detect the rotation of the throttle grip and the corresponding rotary internal shaft, this embodiment utilizes a linear position sensor 122 defined by a stationary component 124 mounted on PC board 126 and a moving component, namely magnet 128, that moves axially with cam 130. As the twist grip is rotated by the user, cam 130 translates axially as described previously with reference to the first and fourth embodiments. Relative movement of magnet 128 and sensor 122 generates an inductive signal which is processed by a microprocessor chip 132 mounted on board 126. If desired, redundant inductors and microprocessors can be provided in order to provide a failsafe system. As an alternative to inductive coupling, a resistive wiper mechanism can alternatively be provided, as can a number of other conventionally known linear position indicators known in the art. Since sensor 122 only detects axial movement of the cam, the over-travel mechanical extension slot, previously described, is not useful in providing an over travel signal, therefore if an over travel signal is desired for cruise control off, a rotary offset flag 133 can be mounted on the end of shaft 134 adjacent the printed circuit board 126 for cooperating with a switch 136 mounted on the circuit board. Switch 136 may include mechanical contacts, or an inductive sensor, which detects the position of flag 132 without mechanical contact.

Figure 11:
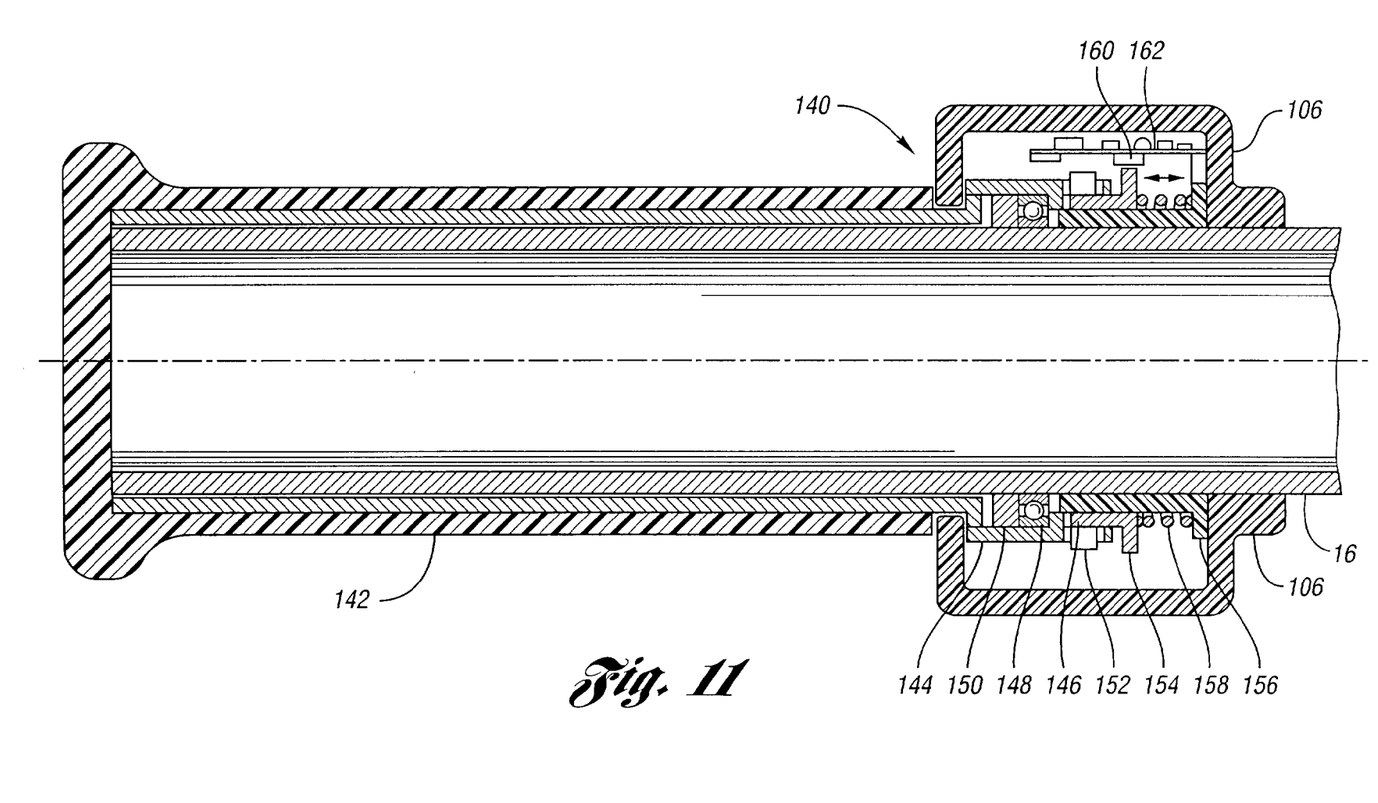
FIG. 11 is a cross-sectional side elevation view of a sixth example of a handlebar throttle controller of the present invention.

A sixth embodiment of the present invention is illustrated by throttle control 140 in FIG. 11. Throttle control 140 differs primarily from throttle controller 120 of FIG. 10 by the fact that it is located externally, in this example coaxially about handlebar 16, rather than within the internal cavity formed within the handlebar. The spring and cam mechanism of throttle control 140 is housed within switch housing 106. The throttle control includes a grip assembly 142 which fits over the end of handlebar 16 for free rotation and limited axial movement relative thereto in a manner described with reference to FIG. 8 previously. The end of the grip assembly 142 within the switch housing 106 is provided with notches or splines which engage a rotary cam 144. Rotary cam 144 is provided with a pair of cam slots 146 in a manner similar to cam 130 in FIG. 10. Rotary cam 144 is supported upon a bearing 148 and a stop ring 150, which are affixed to the handlebar 16. As the rotary cam 144 rotates with the grip assembly 142, a pair of rollers 152, which are pivotally connected to a slide 154, move axially. Slide 154 is splined or keyed to a collar 156 which is affixed to the handlebar 16. A coil compression spring 158 is interposed between collar 158 and slide 154, as shown, which urges the slide 154 outwardly toward the distal end of the handlebar 16, causing the roller 154 to return the cam 144 and the grip assembly 142 to the closed throttle position. Slide 154 moves axially in response to rotation of the throttle grip 142. A sensor 160 oriented on a circuit board 162 provides an electrical output which is a function of the grip position. Of course, a rotary sensor could be utilized as discussed previously as opposed to the linear detector. The throttle control of the present invention is quite adaptable and suitable for orientation in a variety of locations as dictated by the particular application and space available.

While an exemplary embodiment of the invention has been illustrated and described, it is not intended that the exemplary embodiment illustrate and describe all possible forms of the invention. Rather, the words used in the specification are words of description rather than limitation, and it is understood that various changes may be made without departing from the spirit and scope of the invention. For example, while the exemplary throttle controllers 10, 60, 70 are described in the context of an electronic throttle control system for a motorcycle, it will be appreciated that a throttle controller in accordance with the invention is suitable for use wherever a handlebar-mounted rotatable control element is desired, including, for example, all-terrain vehicles, lawn and snow-removal equipment, and other power tools.

What is claimed is:

1. A throttle controller for installation in an end of a generally-tubular handlebar of a motorcycle, the throttle controller comprising:
    a cylindrical housing adapted to be nonrotatably received within the end of the handlebar;
    an elongate shaft supported within the housing for relative rotation about a longitudinal axis;
    a first spring angularly biasing the shaft toward a first angular position relative to the housing;
    at least one coupling selected from the group consisting of a cam and follower arrangement, and a friction element and reaction element arrangement, wherein the at least one coupling is supported by at least one of the housing and the shaft, and wherein the at least one coupling generates a first torque characteristic resisting relative rotation of the shaft within the housing when the shaft is rotated in a first direction relative to the housing, and a second torque characteristic assisting relative rotation of the shaft within the housing when the shaft is rotated in a second direction relative to the housing; and
    a sensor on the housing generating an electrical output representative of an instantaneous angular position of the shaft relative to the housing;
    wherein the first torque characteristic is greater than the second torque characteristic at a throttle grip angle that does not correspond to an idle throttle position thereby providing a hysteresis effect.

2. The throttle controller of claim 1, wherein a first coupling has a cam and follower arrangement, the cam defining a cam surface on one of the housing and the shaft, the follower being mounted on the other of the housing and the shaft, the follower engaging the cam surface to thereby increasingly resist relative rotation of the shaft within the housing as the shaft is rotated in the first direction.

3. The throttle controller of claim 2, wherein the cam is positioned about the shaft for relative axial movement, wherein the follower is mounted on the shaft, and wherein the first spring is operative to axially bias the cam toward the follower to urge the shaft toward a first angular position corresponding to a minimum relative shaft angle.

4. The throttle controller of claim 3, wherein the first spring is disposed about the shaft.

5. The throttle controller of claim 2, wherein a second coupling includes a first friction element and reaction element arrangement having a first friction element and a first reaction element, the first friction element and first reaction element being operative to resist relative movement of the shaft within the housing in each of the first and second directions.

6. The throttle controller of claim 5, wherein one of the first friction element and the first reaction element is a bushing.

7. A throttle controller for installation upon the end of a handlebar of a motorcycle, the throttle controller comprising:
    a cylindrical housing adapted to be non-rotatably mounted upon the end of a handlebar;
    a shaft pivotally supported relative to the housing for relative rotation about a longitudinal axis;
    a twist grip pivotally mounted to the end of the handlebar, affixed to the shaft for rotation therewith;
    a first spring biasing the shaft and the associated twist grip toward a first angle or position relative to the housing corresponding to an idle throttle position from a second angular position corresponding to a WOT (wide open throttle) position;

a damper having at least two elements, one cooperating with the housing and the other cooperating with the shaft to provide hysteresis between the twist grip apply force as the twist grip is rotated in the direction toward WOT and the return force observed by the operator as the first spring urges the shaft and the twist grip toward the idle position; and a sensor affixed to the housing for generating an electrical output which varies as a function of angular position of the shaft relative to the housing as the operator rotates the twist grip between the idle and WOT positions.

8. The throttle controller of claim 7, wherein the maximum apply force exerted by the operator on the twist grip at the WOT position is two times the return force exerted upon the operator by the twist grip.

9. The throttle controller of claim 7, wherein the maximum apply force exerted by the operator on the twist grip at WOT is over 7" pounds.

10. The throttle controller of claim 7, wherein the maximum return force exerted by the operator on the twist grip at WOT is less than 4" pounds.

11. The throttle controller of claim 7, wherein a plot of angular rotation of the twist grip versus the apply force as the twist grip is moved the direction of WOT is generally linear in the 10% to 90% of the twist grip's range of travel.

12. The throttle controller of claim 7, wherein a plot of angular rotation of the twist grip versus the return force as a twist grip moves back toward the idle position is generally linear in the 10% to 90% of the twist grip's range of travel.

13. The throttle controller of claim 7, wherein the damper comprises a generally spiral cam and a corresponding follower mounted radially offset from the longitudinal axis of the shaft wherein the rotation of one of the cam and follower elements results in the axial movement of the other element relative to the housing.

14. The throttle controller of claim 7, wherein the first spring axially biases the cam and follower in an axial direction that urges the twist grip to return to the idle throttle position.

15. The throttle controller of claim 7, wherein the first grip is located coaxially to and external to the outer periphery of a handlebar with the remainder of the throttle controller oriented generally within a tubular bore formed internally to the handlebar.

16. A throttle controller for installation in an end of a generally-tubular handlebar of a motorcycle, the throttle controller comprising:

a cylindrical housing adapted to be nonrotatably received within the end of the handlebar;

an elongate shaft supported within the housing for relative rotation about a longitudinal axis;

a first spring angularly biasing the shaft toward a first angular position relative to the housing;

at least one coupling selected from the group consisting of a cam and follower arrangement, and a friction element and reaction element arrangement, wherein the at least one coupling is supported by at least one of the housing and the shaft, and wherein the at least one coupling generates a first torque characteristic resisting relative rotation of the shaft within the housing when the shaft is rotated in a first direction relative to the housing, and a second torque characteristic assisting relative rotation of the shaft within the housing when the shaft is rotated in a second direction relative to the housing; and a sensor on the housing generating an electrical output representative of an instantaneous angular position of the shaft relative to the housing;

wherein a first coupling provides a third torque characteristic resisting relative rotation of the shaft within the housing when the shaft is rotated in the second direction relative to the housing, past an idle position of the shaft.

17. The throttle controller of claim 16, wherein the first coupling provides a fourth torque characteristic resisting relative rotation of the shaft within the housing when the shaft is rotated in the first direction relative to the housing, towards the idle position of the shaft.

18. The throttle controller of claim 16, wherein the first coupling has a cam and follower arrangement, the cam defining a first cam surface and a second cam surface on one of the housing and the shaft, the follower being mounted on the other of the housing and the shaft, the follower engaging the first cam surface to thereby increasingly resist relative rotation of the shaft within the housing as the shaft is rotated in the first direction past the idle position of the shaft, the follower engaging the second cam surface to thereby increasingly resist relative rotation of the shaft within the housing as the shaft is rotated in the second direction past the idle position of the shaft.

19. The throttle controller of claim 16, wherein the sensor generates an electrical output representative of the angular position of the shaft, when the shaft is actuated to over travel the idle position.

20. The throttle controller of claim 16, wherein the sensor generates an electrical output representative of the angular position of the shaft to provide a cruise control OFF signal, when the shaft is actuated to over travel the idle position.

21. A throttle controller for installation upon the end of a handlebar of a motorcycle, the throttle controller comprising:

a cylindrical housing adapted to be non-rotatably mounted upon the end of a handlebar;

a shaft pivotally supported relative to the housing for relative rotation about a longitudinal axis;

a twist grip pivotally mounted to the end of the handlebar, affixed to the shaft for rotation therewith;

a first spring biasing the shaft and the associated twist grip toward a first angle or position relative to the housing corresponding to an idle throttle position from a second angular position corresponding to a WOT (wide open throttle) position;

a damper having at least two elements, one cooperating with the housing and the other cooperating with the shaft to provide hysteresis between the twist grip apply force as the twist grip is rotated in the direction toward WOT and the return force observed by the operator as the first spring urges the shaft and the twist grip toward the idle position resulting in the twist grip apply force and return force which generally correspond to a conventional motorcycle cable throttle mechanism; and a sensor affixed to the housing for generating an electrical output which varies as a function of angular position of the shaft relative to the housing as the operator rotates the twist grip between the idle and WOT positions;

wherein the damper permits over travel of the shaft past the idle throttle position when the shaft is rotated in the direction from the WOT position to the idle throttle position.

22. The throttle controller of claim 21, wherein the sensor generates an electrical output representative of the angular position of the shaft, when the shaft is actuated to over travel the idle position.

23. The throttle controller of claim 21, wherein the sensor generates an electrical output representative of the angular position of the shaft to provide a cruise control OFF signal, when the shaft is actuated to over travel the idle position.

24. The throttle controller of claim 1, wherein the first angular position of the shaft relative to the housing corresponds to an idle throttle position.

25. The throttle controller of claim 1, wherein the first direction is further defined from an idle throttle position of the shaft relative to the housing, to a WOT (wide open throttle) position of the shaft relative to the housing.

26. The throttle controller of claim 1, wherein the second direction is further defined from a WOT (wide open throttle) position of the shaft relative to the housing, to an idle throttle position of the shaft relative to the housing.

27. A throttle controller for installation in an end of a generally-tubular handlebar of a motorcycle, the throttle controller comprising:

a cylindrical housing adapted to be nonrotatably received within the end of the handlebar;

an elongate shaft supported within the housing for relative rotation about a longitudinal axis;

a first spring angularly biasing the shaft toward a first angular position relative to the housing;

at least one coupling selected from the group consisting of a cam and follower arrangement, and a friction element and reaction element arrangement, wherein the at least one coupling is supported by at least one of the housing and the shaft, and wherein the at least one coupling generates a first torque characteristic when the shaft is rotated in a first direction relative to the housing, and a second torque characteristic when the shaft is rotated in a second direction relative to the housing; and a sensor on the housing generating an electrical output representative of an instantaneous angular position of the shaft relative to the housing;

wherein a first coupling provides a third torque characteristic resisting relative rotation of the shaft within the housing when the shaft is rotated in the second direction relative to the housing, past an idle position of the shaft.

* * * * *